US005482078A

United States Patent [19]

Yeh

[11] Patent Number: 5,482,078

[45] Date of Patent: Jan. 9, 1996

[54] WATER FAUCET FITTING SEAT CAPABLE OF PRODUCING MUSICAL TONE OR ANIMAL HOWL

[76] Inventor: Thomas Yeh, 10F, No. 97, Sec. 2, Nan-Gun Rd., Taipei, Taiwan

[21] Appl. No.: 330,581

[22] Filed: Oct. 28, 1994

[51] Int. Cl.[6] .......... F16K 37/00; G08B 21/00

[52] U.S. Cl. .......... 137/551; 4/661; 239/72; 340/603; 340/692; 340/606

[58] Field of Search .......... 137/551, 557; 4/661, 675, 678; 222/39; 239/72, 211, 289; 340/603, 606, 692

[56] References Cited

U.S. PATENT DOCUMENTS

| | | | |
|---|---|---|---|
| 1,381,306 | 6/1921 | Hopwood et al. | 239/72 |
| 2,798,215 | 7/1957 | Domingo et al. | 340/606 |
| 3,445,834 | 5/1969 | Street et al. | 340/606 |
| 3,493,951 | 2/1970 | Hartka et al. | 340/606 |
| 4,065,675 | 12/1977 | Gold | 340/606 |
| 4,162,490 | 7/1979 | Fu et al. | 340/603 |
| 4,353,139 | 10/1982 | Wainwright et al. | 4/661 |
| 4,406,382 | 9/1983 | Roth | 137/551 X |
| 4,728,924 | 3/1988 | Franklin | 340/603 X |
| 5,213,234 | 5/1993 | Stefanopoulos | 222/39 X |
| 5,337,956 | 8/1994 | Crutcher | 239/211 X |

*Primary Examiner*—John Rivell
*Attorney, Agent, or Firm*—Browdy and Neimark

[57] ABSTRACT

A water faucet fitting seat capable of producing a musical tone or animal howl comprises a base and a sound producing device. The hollow base is provided therein with a channel having one end serving as a water outlet and another end which serves as a water inlet and can be fastened to the outlet of a water faucet. The base is further provided therein with a recessed seat having a round hole in communication with the channel. The sound producing device is disposed in the recessed seat and is provided with a speaker, a sound control circuit board and a conducting switch which is connected with the sound control circuit board and is provided with two terminals spaced at an interval and located in the channel via the round hole of the recessed seat. The two terminals are capable of communicating with each other to trigger a reproduction of a musical tone or animal howl stored programmably in the control circuit board when the water faucet is turned on to permit the flow of water through the channel of the base, with the water acting as a conducting medium to cause the two terminals to communicate with each other.

1 Claim, 2 Drawing Sheets

WATER FAUCET FITTING SEAT CAPABLE OF PRODUCING MUSICAL TONE OR ANIMAL HOWL

FIELD OF THE INVENTION

The present invention relates generally to a water faucet fitting seat, and more particularly to a water faucet fitting seat capable of producing a musical tone or an animal howl when the water faucet is opened to permit the flow of water from the water pipe.

BACKGROUND OF THE INVENTION

Some people are often so absent-minded that they forget to turn off the faucet after they have tapped the water or done the washings. Such a habitual forgetfulness can be a factor responsible for a senseless waste of the water resource. It is therefore imperative that people must be reminded constantly of the importance of conserving the water resource. One of the best ways to achieve such an objective is to use a device capable of reminding people of their failure to turn off the tap. In addition, it is a current popular trend that various household appliances are equipped with certain means capable of making the appliances entertaining and interesting. The water faucet is an indispensable device that we use daily.

SUMMARY OF THE INVENTION

It is therefore the primary objective of the present invention to provide an entertaining water faucet fitting seat capable of producing a musical tone or a sound mimicking an animal howl when the Water faucet is turned on to permit the flow of water from the pipe.

It is another objective of the present invention to provide a remindful water faucet fitting seat capable of causing an absent-minded person to turn off the tap by producing a musical tone or a sound mimicking an animal howl when the water faucet is turned on to permit the flow of water from the pipe.

The foregoing objectives of the present invention are attained by a water faucet fitting seat, which comprises a base and a sound producing device. The base of a hollow construction is provided therein with a channel which has one end serving as a water inlet and has another end serving as a water outlet. The base is further provided therein with a recessed seat in which the sound producing device is disposed. The sound producing device has a first cylindrical body and a second cylindrical body which is dimensioned to fit into the first cylindrical body such that the first cylindrical body and the second cylindrical body are provided therein with a receiving space in which a speaker and a sound control circuit board are housed. The sound control circuit board is connected with a conducting switch having two terminals which are not in contact with each other and are located in the channel of the base. As water is permitted to flow through the channel, the water in the channel serves as a conducting medium through which the two terminals of the conducting switch are in communication with each other so as to bring about the sound producing effect of the water faucet fitting seat.

The foregoing objectives, features and functions of the present invention will be more readily understood upon a thoughtful deliberation of the following detailed description of the present invention in conjunction with the accompanying drawings.

DETAILED DESCRIPTION OF THE INVENTION

Figure 1:
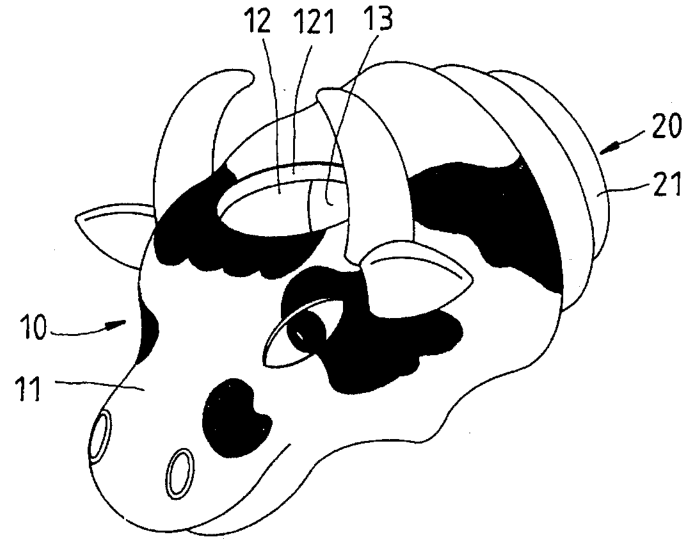
FIG. 1 shows a perspective view of a preferred embodiment of the present invention.
Figure 2:
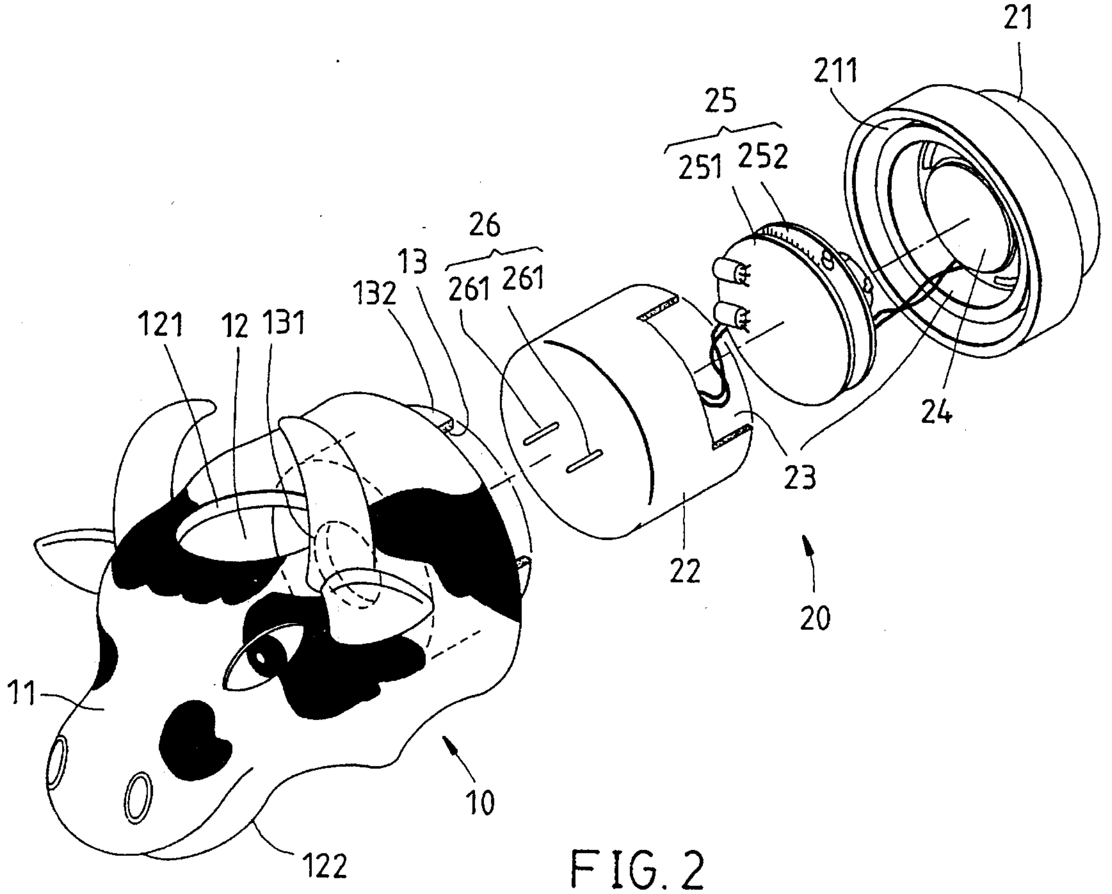
FIG. 2 shows an exploded view of the preferred embodiment as shown in FIG. 1.
Figure 3:
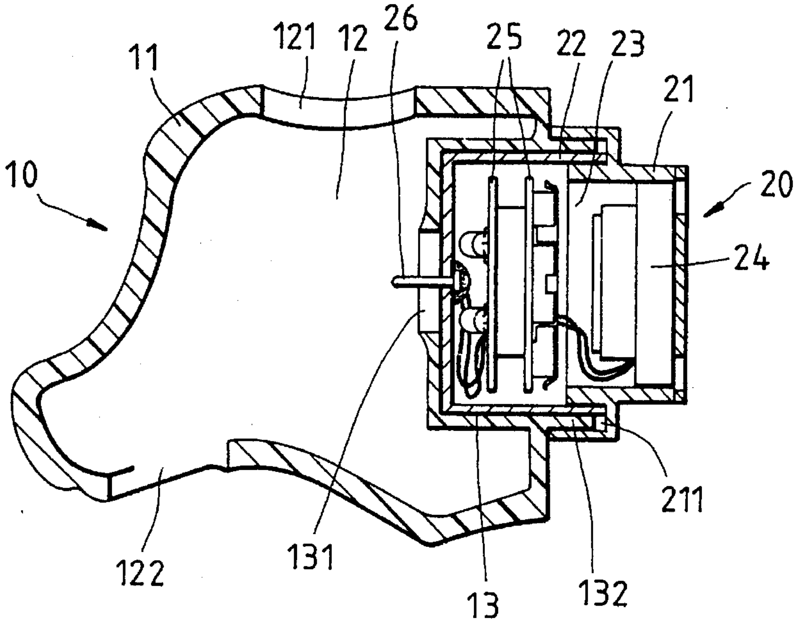
FIG. 3 shows a sectional view of the preferred embodiment as shown in FIG. 1.

As shown in FIGS. 1–3, a water faucet fitting seat embodied in the present invention comprises mainly a base 10 and a sound producing device 20.

The base 10 of a hollow construction is provided with a head 11 similar in profile to a cow head and is further provided with a channel 12 which has one end serving as a water inlet 121 and another end serving as a water outlet 122. The base 10 is still further provided therein with a recessed seat 13, which has in one end thereof a round hole 131 extending inwards and communicating with the channel 12 and which has in another end thereof a protuberance 132 extending outwards.

The sound producing device 20 is disposed in the recessed seat 13 of the base 10 and is provided with a first cylindrical body 21 and a second cylindrical body 22 engageable with the first cylindrical body 21. The first cylindrical body 21 is provided with a circular retaining portion 211 capable of holding securely the second cylindrical body 22 such that a receiving space 23 is formed jointly by the first cylindrical body 21 and the second cylindrical body 22. The receiving space 23 is dimensioned to house therein a speaker 24, a sound control circuit board 25, and a conducting switch 26 which is connected with the control circuit board 25. The sound control circuit board 25 has two round circuit boards 251 and 252. The round circuit board 251 is provided with a plurality of batteries and an integrated circuit for storing a preprogrammed "MOO-MOO" howl of a cow. The conducting switch 26 is provided with two conducting terminals 261 which are spaced at a predetermined interval.

Figure 4:
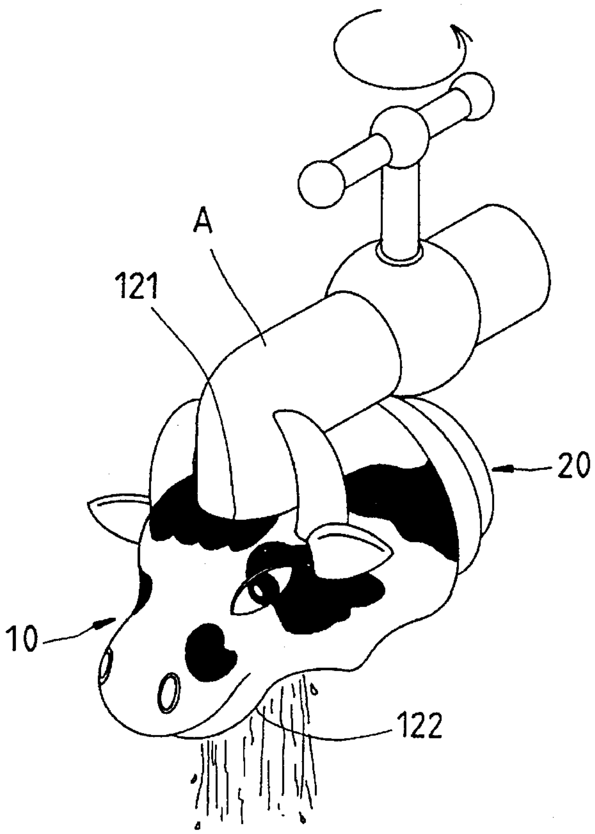
FIG. 4 shows a schematic view of the preferred embodiment of the present invention which is fastened to a water faucet.

In combination, the second cylindrical body 22 is fitted into the first cylindrical body 21 such that the second cylindrical body 22 is held securely by the inner part of the retaining portion 211 of the first cylindrical body 21, and that the protuberance 132 of the recessed seat 13 of the base 10 is fitted into the outer part of the retaining portion 211 of the first cylindrical body 21. As a result, the sound producing device 20 is disposed in the recessed seat 13 of the base 10 in such a manner that the two conducting terminals 261 are located in the channel 12 via the round hole 131 of the recessed seat 13. In operation, the water inlet 121 of the base 10 is fastened to a water faucet A, as shown in FIG. 4. As the water faucet A is turned on, the water is permitted to flow through the channel 12 of the base 10. The water in the channel 12 serves as a conducting medium capable of causing the two terminals 261 of the conducting switch 26 to communicate with each other so as to turn on the integrated circuit of the round circuit board 251 of the sound control circuit board 25. As long as the water is permitted to flow through the channel 12 of the base 10, the cow howl of "MOO-MOO" is uttered continuously by the sound producing device 20 of the present invention so as to remind a person to be sure to turn off the tap.

It must be noted here that the nature of the animal howl stored programmably in the integrated circuit of the round circuit board 251 of the control circuit board 25 should be matched with the animal profile of the head 11 of the base 10 of the present invention. It goes without saying that a music may be stored programmably in the integrated circuit of the round circuit board 251 of the control circuit board 25.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A water faucet fitting seat capable of producing a musical tone or an animal howl comprising:

a base having an animal profile or a geometric shape, and a hollow interior provided with a channel having one end serving as a water outlet and another end which serves as a water inlet and can be fastened to the outlet of a water faucet, said base provided therein with a recessed seat having a round hole in communication with said channel; and a sound producing device disposed in said recessed seat of said base and provided with a speaker, a sound control circuit board and a conducting switch which is connected with said sound control circuit board and is provided with two terminals spaced at an interval and located in said channel via said round hole of said recessed seat of said base, said two terminals of said conducting switch capable of communicating with each other to trigger a reproduction of a musical tone or animal howl stored programmably in an integrated circuit of said sound control circuit board when said water faucet is turned on to permit water to flow through said channel of said base, with said water acting as a conducting medium to cause said two terminals to be in communication with each other.

* * * * *